(12) United States Patent
Kawai

(10) Patent No.: US 7,626,281 B2
(45) Date of Patent: Dec. 1, 2009

(54) ENERGY CONVERTER, FLAG TYPE ENERGY CONVERTER

(75) Inventor: Hiromasa Kawai, Kyoto (JP)

(73) Assignee: Kyoto University, Kyoto (JP)

( * ) Notice: Subject to any disclaimer, the term of this patent is extended or adjusted under 35 U.S.C. 154(b) by 329 days.

(21) Appl. No.: 11/665,634

(22) PCT Filed: Oct. 19, 2005

(86) PCT No.: PCT/JP2005/019220

§ 371 (c)(1), (2), (4) Date: Apr. 18, 2007

(87) PCT Pub. No.: WO2006/043600

PCT Pub. Date: Apr. 27, 2006

(65) Prior Publication Data

US 2009/0121489 A1   May 14, 2009

(30) Foreign Application Priority Data

Oct. 19, 2004   (JP)   ............................. 2004-304150

(51) Int. Cl.
*F03B 13/00* (2006.01)
*F03D 9/00* (2006.01)
*F02B 63/04* (2006.01)
*F03G 7/08* (2006.01)
*H02K 7/18* (2006.01)

(52) U.S. Cl. ........................... 290/54; 290/1 R; 290/55

(58) Field of Classification Search .................. 290/1 R, 290/54, 55
See application file for complete search history.

(56) References Cited

U.S. PATENT DOCUMENTS 4,024,409 A * 5/1977 Payne ........................... 290/55
4,184,805 A * 1/1980 Arnold ........................... 416/1

(Continued)

FOREIGN PATENT DOCUMENTS

FR   2620172 A1   3/1989

(Continued)

OTHER PUBLICATIONS

International Search Report of PCT/JP2005/019220, date of mailing Jan. 17, 2006.

*Primary Examiner*—Nicholas Ponomarenko
*Assistant Examiner*—Pedro J Cuevas
(74) *Attorney, Agent, or Firm*—Westerman, Hattori, Daniels & Adrian, LLP

(57) ABSTRACT

An energy converter comprises a flexible plane unit 1 placed in a position to be exposed to a flow of fluid such as wind, at least a part of peripheral edge of the flexible plane unit 1 being capable of fluttering freely with the flow, an energy conversion unit 31 for converting vibration energy into electric energy, and a transmission unit 2 connected to the flexible plane unit 1 and for transmitting a vibration caused on the flexible plane unit by the flow to the energy conversion unit 31.

10 Claims, 6 Drawing Sheets

U.S. PATENT DOCUMENTS

| | | | | |
|---|---|---|---|---|
| 4,228,360 A * | 10/1980 | Navarro | ......................... | 290/43 |
| 4,276,033 A * | 6/1981 | Krovina | ......................... | 440/8 |
| 4,346,305 A * | 8/1982 | White | ......................... | 290/55 |
| 4,348,594 A | 9/1982 | Lipfert | ......................... | 290/54 |
| 4,371,788 A * | 2/1983 | Smith, Jr. | ......................... | 290/42 |
| 4,387,318 A * | 6/1983 | Kolm et al. | ................. | 310/330 |
| 4,396,852 A * | 8/1983 | Hunt | ......................... | 310/329 |
| 4,476,397 A | 10/1984 | Lawson | ......................... | 290/54 |
| 4,524,283 A * | 6/1985 | Latvus | ......................... | 290/1 E |
| 4,536,674 A * | 8/1985 | Schmidt | .................... | 310/330 |
| 4,729,716 A * | 3/1988 | Schmidt | ......................... | 416/10 |
| 4,730,119 A * | 3/1988 | Biscomb | ......................... | 290/55 |
| 4,792,700 A * | 12/1988 | Ammons | ......................... | 290/44 |
| 4,832,571 A * | 5/1989 | Carrol | ......................... | 416/132 B |
| 5,223,763 A * | 6/1993 | Chang | ......................... | 310/339 |
| 6,273,680 B1 * | 8/2001 | Arnold | ......................... | 416/1 |
| 6,424,079 B1 * | 7/2002 | Carroll | ......................... | 310/339 |
| 6,700,218 B2 * | 3/2004 | Saiz | ......................... | 290/55 |
| 7,224,077 B2 * | 5/2007 | Allen | ......................... | 290/1 R |
| 7,476,984 B2 * | 1/2009 | Kim et al. | ................... | 290/1 E |
| 7,573,143 B2 * | 8/2009 | Frayne | ......................... | 290/1 R |
| 2003/0141720 A1* | 7/2003 | Saiz | ......................... | 290/55 |
| 2006/0064972 A1* | 3/2006 | Allen | ......................... | 60/369 |
| 2006/0202569 A1* | 9/2006 | Chen | ......................... | 310/36 |
| 2007/0257494 A1* | 11/2007 | Vida Marques | ............... | 290/55 |
| 2008/0129254 A1* | 6/2008 | Frayne | ......................... | 322/3 |
| 2009/0058091 A1* | 3/2009 | Douglas | ..................... | 290/53 |

FOREIGN PATENT DOCUMENTS

| | | |
|---|---|---|
| JP | 59-170474 A | 9/1984 |
| JP | 2000-320443 A | 11/2000 |
| JP | 2001-351416 A | 12/2001 |
| JP | 2003-116258 A | 4/2003 |
| JP | 2005273644 A * | 10/2005 |
| WO | WO 2006043600 A1 * | 4/2006 |

\* cited by examiner

ENERGY CONVERTER, FLAG TYPE ENERGY CONVERTER

TECHNICAL FIELD

The present invention relates to an energy converter or the like for extracting energy from a vibration excited on the flexible plane by a fluid.

BACKGROUND

In recent years, environmental problems such as the global warming have increased the expectation to the energy converter that generates an electric power by using wind that is a natural energy.

This kind of energy converter, such as a propeller type impeller consisting of one or plural fans which is realized a portion to be received wind by rigid member, or a generator which is utilized a vibration exited on a cloth perpendicular, and in which a portion to be received wind is a flexible member, the cloth being extended with some tension in parallel with guide boards which are arranged so as to form a gap guiding wind, is known (for instance, refer to patent document 1).

Patent document: U.S. Pat. No. 4,348,594

DISCLOSURE OF INVENTION

Problems to be Solved by the Invention

However, in an arrangement of the former, it is impossible to generate an electric power when the wind blows weak and then the fans are not rotated. Moreover, the former has problems relating to the generation efficiency based on intension of the wind, and security or the like, wherein if the former is located in a place where wind among buildings, for instance, always blows, strong wind might cause the excessively fast rotation of the fans and damage them.

In the latter case, the power generation efficiency is high only for a vibration that is generated when a resonance cycle determined by a distribution mass of the cloth, a mass of a moving coil and a tension given becomes equal to a whirlpool cycle of the wind. However, the power generation efficiency is low because the whirlpool cycle fluctuates by the wind velocity change, and then, the probability of the resonance is very low. Moreover, the mass of the moving coil is larger than that of the cloth, and therefore, the moving coil cannot defined a light vibration body as requirements that cause flutter, and the latter can be practically used only in a very strong wind area.

The present invention has been made in light of the above-described problem, and is intend to provide the energy converter that is able to generate electricity without depending on a velocity of fluid, is safe to have little fear of damage with fluid such as the turbulent wind and is able to be realized economically.

Means to Solve the Problems

A energy converter of the present invention is characterized by comprising a flexible plane unit made of cloth and placed in a position to be exposed to a flow of fluid such as wind, at least a part of peripheral edge of the flexible plane unit being capable of fluttering freely with the flow, an energy conversion unit for converting vibration energy into electric energy, and a transmission unit connected to the flexible plane unit and for transmitting a vibration caused on the flexible plane unit by the flow to the energy conversion unit an a base structure being able to be fixed on a building, a ground or the like, wherein a supporting pole supported on the base structure supports the flexible plane unit so as to flutter freely without a proper period, and the energy conversion unit is of using a piezoelectric effect of a piezoelectric bimorph element that is a piezoelectric device, one end of the piezoelectric bimorph element being supported on the base structure and the other end of the piezoelectric bimorph element being attached on the flexible plane unit through the transmission unit.

Another energy converter of the present invention is characterized by comprising a flexible plane unit made of cloth and placed in a position to be exposed to a flow of fluid such as wind, at least a part of peripheral edge of the flexible plane unit being capable of fluttering freely with the flow, an energy conversion unit for converting vibration energy into electric energy, a transmission unit connected to the flexible plane unit and for transmitting a vibration caused on the flexible plan unit by the flow to the energy conversion unit, and a base structure being able to be fixed on a building, a ground or the like, wherein a supporting pole supported on the base structure supports the flexible plane unit so as to flutter freely without a proper period, and the energy conversion unit is a rotation dynamo using a electromagnetic induction of a magnetic substance and a coil.

With the above-described constitution, because the flexible plane unit it self has no proper period, the flexible plane unit flutters by the pulse of the fluid flow while changing its shape according to the ever-changing pressure distribution of the fluid, and the vibration on the flexible plane unit is excited at any flow velocity by absorbing the energy such as a pressure of the fluid. And, the vibration excited on the flexible plane unit is transmitted through the transmission unit to the energy conversion unit to be converted into electric energy. Moreover, because the flexible plane unit, which is a portion for receiving the fluid flow, is not rigid like the funs of the propeller type pinwheel, there is little fear for the damage by the fluid turbulence. Even if such a damage happens by any chance, the probability of the fatal injure to human beings is greatly low. And, this system can be realized at low cost because the flexible plane unit is made of cloth.

That is to say, it is allowable to provide the energy converter that is able to generate electricity without depending on a velocity of fluid, is safe to have little fear of damage with fluid such as the turbulent wind and is able to be realized economically.

In order to prevent the sag of the flexible plane unit and expose the entire of the flexible plane unit to the flow, it is preferable to prepare a hanging unit hanging the part or whole of the peripheral edge of the flexible plane unit made of cloth with allowance of fluttering substantially free.

The preferable embodiment of the present invention, wherein two hanging units are provided to the flexible plane unit, the flexible plane unit fluttering at a windward side as a reference axis, one of two hanging units is adapted to be provided at the windward side of upside peripheral edge of the flexible plane unit made of cloth, the other thereof is adapted to be provided at a leeward side of upside edge portion of the flexible plane unit made of cloth, and the transmission unit is adapted to be connected to the windward side of bottom peripheral edge of the flexible plane unit made of cloth, will be described after.

To give the slack to the flexible plane unit, it is preferable to provide hanging height position changing means for changing an attaching position of the flexible plane unit is provided, whereby the slack between the upside peripheral edge and the bottom peripheral edge of the flexible plane unit made of cloth is allowed to be generated.

If a stopper having a pair of stopper edge provided away from the pedestal side of the peripheral edge of the flexible plane unit made of cloth so as to sandwich the pedestal side of the peripheral edge which becomes the reference axis of fluttering is provided, it is possible to prevent the transmission unit etc. from the damage, because even if the flexible plane unit flutters excessively by the fluid flow, the pair of stopper edge can regulate the useless flutter.

If the flexible plane unit is of a vertically long flag having a longitudinal dimension in perpendicular direction, it is possible to regulate the useless flutter of the flexible plane unit and prevent such a trouble as the distal edge of the flexible plane twines around the pedestal edge thereof.

If a supporting pole being provided along the pedestal side of the flexible plane unit which becomes the reference axis of fluttering and supporting the flexible plane unit indirectly or directly, and a rotatable supporting portion supporting the supporting pole so as to be able to rotate around a axis of the supporting pole are provided, the best energy conversion can be obtained by changing the direction of the flexible plane unit depending on the flow direction, because when the flexible plane unit flutters slowly, the supporting pole rotates with following the slow change of fluttering of the flexible plane unit, or when the flexible plane unit flutters rapidly, the supporting pole operates so as not to follow the movement of flexible plane unit, for example.

In order to increase the energy conversion efficiency for the low velocity wind, it is desirable that when the flexible plane unit is placed in substantially parallel in a flowing direction of the fluid, the transmission unit transmits to the energy conversion unit a vibration generated in the flowing direction of the fluid at a windward of the fluid of the flexible plane unit. And when the flexible plane unit made of a cloth is placed in substantially parallel in a flowing direction of the fluid, it is desirable that the energy conversion unit is installed on a flagpole functioning as the transmission unit and a vibration generated on the flexible plane unit made of cloth is transmitted to the energy conversion unit as the flagpole vibration. Moreover, it is preferable that a transmission unit coupled at intermediate position between the windward and leeward of the fluid of the flexible plane unit made of cloth transmits to the energy conversion unit the vibration generated by making an end of leeward of the fluid of the flexible plane made of cloth unit into a free end.

Effect of the Invention

With the above-described constitution, because the flexible plane unit it self has no proper period, it flutters by the pulse of the fluid flow while changing its shape according to the ever-changing pressure distribution of the fluid, and the vibration on the flexible plane unit is excited at any flow velocity by absorbing the energy such as a pressure of the fluid. And, the vibration excited on the flexible plane unit is transmitted through the transmission unit to the energy conversion unit to be converted into electric energy. Moreover, because the flexible plane unit, which is a portion for receiving the fluid flow, is not rigid like the funs of the propeller type pinwheel, there is little fear for the damage by the fluid turbulence. Even if such a damage happens by any chance, the probability of the fatal injure to human beings is greatly low. And, this system can be realized at low cost, because the flexible plane unit is made of a cloth.

That is to say, it is allowable to provide the energy converter that is able to generate electricity without depending on a velocity of fluid, is safe to have little fear of damage with fluid such as the turbulent wind and is able to be realized economically.

BEST MODE FOR CARRYING OUT THE INVENTION

First Embodiment

The first embodiment is explained below referring to the figure.

Figure 1:
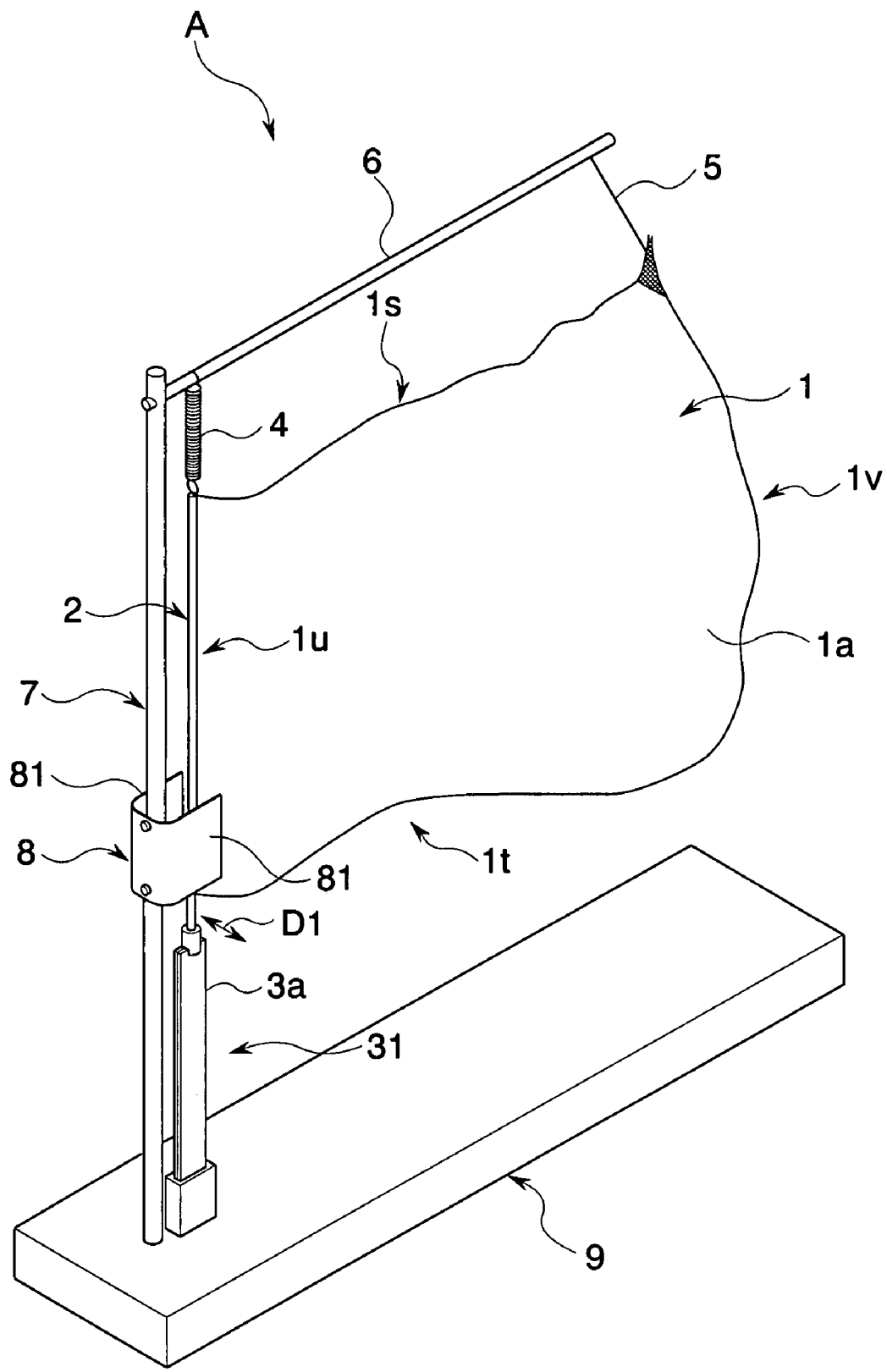
FIG. 1 is a whole perspective view showing the energy converter of a first embodiment according to the present invention.

The energy converter A of this embodiment has a function of a flag type energy converter. As shown in FIG. 1, the energy converter A comprises a substantially rectangular flexible plane unit 1, a stick-like flagpole 2 attached to a windward side of the flexible plane unit 1, a bottom side piezoelectric energy conversion unit 31 connected with a bottom end portion of the flagpole 2 and converting a vibration energy into an electric energy, a rod shaped crosspiece 6 installed along a topside of a peripheral edge is of the flexible plane unit 1 to support a leeward portion of the upside peripheral edge is through a coil spring 4 and a windward portion of the upside peripheral edge is through a cord 5, a supporting pole 7 installed along the flagpole 2 and the piezoelectric energy converter 31 and supporting a windward portion of the crosspiece 6, a stopper 8 fixed at a middle position of the supporting pole 7 and regulating movement of the flagpole 2 swung by the wind, and a base structure 9 that supports the supporting pole 7 and the bottom side piezoelectric energy conversion unit 31.

Hereafter, each unit is explained in detail.

The flexible plane unit 1 is made of light and strong cloth durable to the strong wind.

The flagpole 2 is installed at the windward portion side of the flexible plane unit 1 and has a function of transmitting the vibration caused by the wind on the flexible plane unit 1 to the bottom side piezoelectric energy conversion unit 31 as a transmission unit. In this embodiment, though the flagpole 2 is designed to have an appropriate rigidity so the flexible plane unit 1 flutters at the flagpole 2 as a reference axis, the flagpole 2 can be replaced by a flexible material like a rope.

The bottom side piezoelectric energy conversion unit 31 converts the vibration energy into electric energy and uses the piezoelectric effect of a piezoelectric material in this embodiment.

More concretely, this bottom side piezoelectric energy conversion unit 31 comprises a piezoelectric bimorph element 3a which is a piezoelectric material of the flat hexahedron shape, generating electromotive force when displacement in the direction in thickness is occurred and the electrode (not shown in the figure) connected with the piezoelectric bimorph element 3a. And, the bottom side of the piezoelectric bimorph element 3a is supported by the base structure 9, while the upper side thereof is fixed at the flagpole 2. Moreover, in this embodiment, this piezoelectric energy conversion unit 31 is installed on the base structure 9 so the direction (arrow D1) of the displacement of the piezoelectric bimorph element 3a and that of the flexible plane body 1a of the flexible plane unit 1 are almost equal.

The crosspiece 6 is placed almost horizontally and made of metal or wood. In this embodiment, a coil spring 4 and a cord 5 are used to hang the flexible plane unit 1 stably. Additionally, the coil spring 4 and the cord 5 function as a hanging unit hanging the flexible plane unit 1, while allowing the peripheral edge of the flexible plane unit 1 to flutter almost freely.

A stopper 8 is formed in a U shape shown in a plan view by the plasticity deformation processing of the sheet metal. In this embodiment, a pair of stopping edges 81 are formed on surfaces facing each other. The distance between the stopping edges 81 is larger than the diameter of flagpole 2 and that of the supporting pole 7 so that the flagpole 2 and the supporting pole 7 can be located between the stopping edges 81.

The base structure 9 is made of metal or concrete in the shape of substantially flat hexahedron in order to keep stability even if the flexible plane unit 1 receives the strong wind. The shape of the base structure 9 is not necessarily of substantially flat hexahedron, and so long as the stability can be assured, any shape such as substantially round shown in a plan view is acceptable. And the base structure 9 may be fixed on the building or the ground with the anchor bolt etc.

An application of the energy converter A of this embodiment is explained below.

First of all, the energy converter A is placed so the plane part 1a of the flexible plane unit 1 is in substantially parallel in the wind direction, in other words, the crosspiece 6 is in substantially parallel in the wind direction.

Then, flutter is generated on the flexible plane unit 1 by the wind pulse, while changing its shape according to the ever-changing pressure distribution, and the vibration is excited by absorbing energy such as the wind pressure added to the flexible plane unit 1. This vibration is excited at any wind velocity. Thus, the vibration excited on the flexible plane unit 1 is transmitted to the bottom side piezoelectric energy conversion unit 31 as the vibration of the flagpole 2 as shown by arrow D1 in FIG. 1. And consequently, with the vibration energy reached to the bottom side piezoelectric energy conversion unit 31, the piezoelectric bimorph element 3a of the bottom side piezoelectric energy conversion unit 31 displaces in the same direction with the vibration, and the voltage corresponding to this displacement is generated. Thus, the electric energy can be obtained from the bottom side energy conversion unit 31.

Even when a strong wind blows, the flagpole 2 installed at the pedestal side of the flexible plane unit 1 hits against the stopping edges 81 of the stopper 8, thus, it is possible to prevent the flexible plane unit 1 itself from the break by the excessively strong flutter and the spring 4 and the cord 5 from the damage.

Then, in the energy conversion unit A of this embodiment, the flexible plane unit 1 having no proper period can generate the flutter by the wind pulse, while changing its shape according to the ever-changing pressure distribution. The flutter is excited at any wind by absorbing energy such as the wind pressure added to the flexible plane unit 1. And the vibration generated on the flexible plane unit 1 is transmitted to the bottom side energy conversion unit 31 through the flagpole 2 functioning as the transmission unit and converted into electric energy with the bottom side energy conversion unit 31. Moreover, because the flexible plane unit 1 made of the cloth for receiving the wind flow has no rigidity unlike funs of the propeller type pinwheel, there is little fear for the damage by the fluid turbulence, and even if such a damage happens by any chance, the probability of the fatal injure is very low. Furthermore, this system can be easily constructed at low-cost without damaging the view.

In other words, this energy converter A can generate electric energy at any wind and offer the safe and high performance. There is little fear of damage by the turbulent wind and, in addition, it can reduce the maintenance checkpoints. And therefore, it is possible to offer the low-cost energy converter A without damaging the view.

Moreover, the entire flexible plane unit 1 can be exposed to the wind flow, because while allowing substantially free flutter, the coil spring 4 and the cord 5 hang the peripheral edge of the flexible plane unit 1 so as to prevent the flexible plane unit 1 from sagging.

In addition, the stopper 8 having a pair of the stopping edges 81 is fixed separately from the pedestal portion side 1u of the peripheral edge of the flexible plane unit 1 that is the reference axis of the free flutter and holds the pedestal edge 1u between the stopping edges 81. And therefore, even if the flexible plane unit 1 flutters greatly by the wind, the stopping edges 81 regulate the excessive flutter and prevent the material such as the flagpole 2 functioning as the transmission unit from the damage.

Second Embodiment

Other embodiment of the present invention is explained below referring to the FIG. 2. Now, corresponding sighs are given to the units or the elements having the same function with the first embodiment, and the explanation is omitted.

Figure 2:
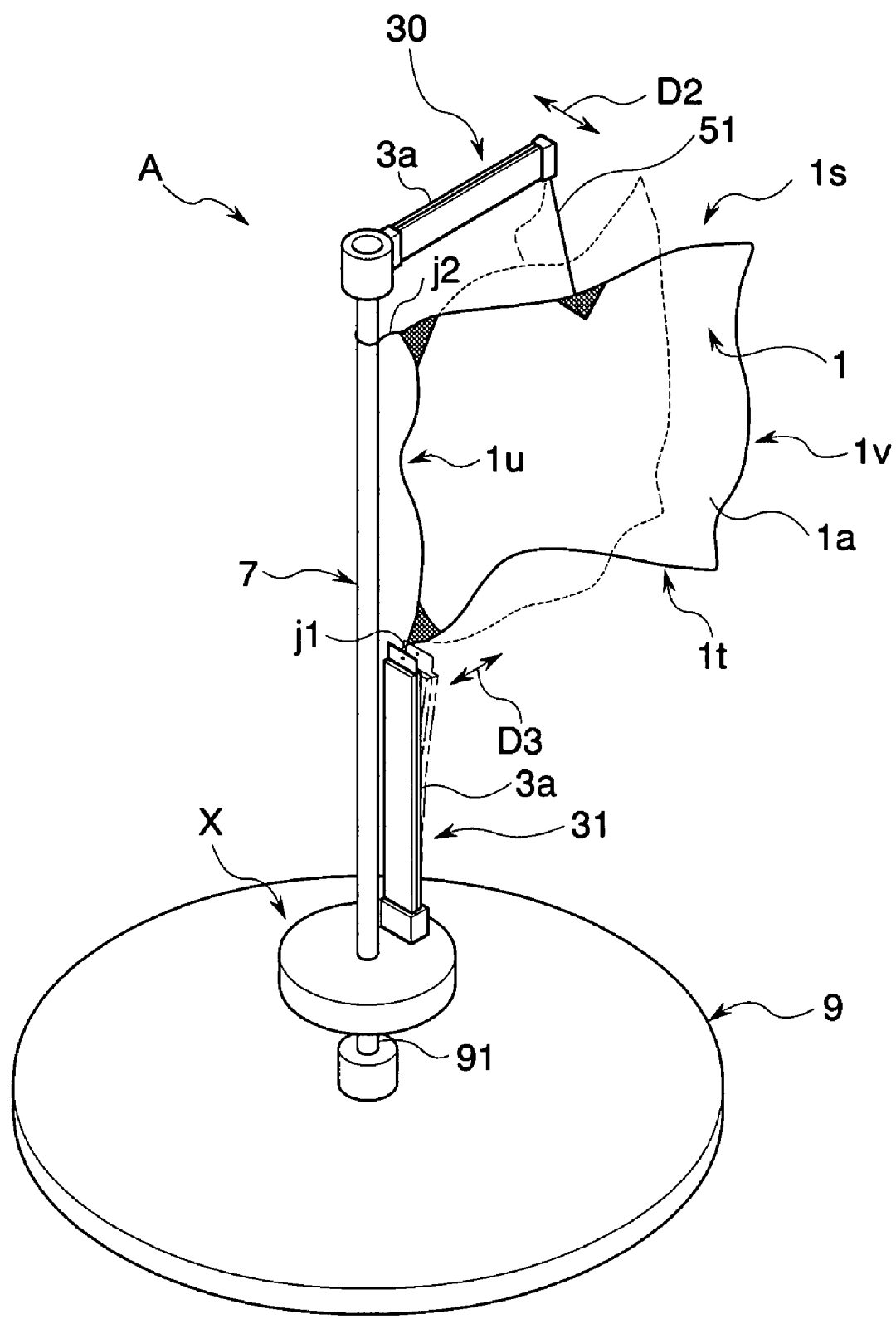
FIG. 2 is a whole perspective view showing the energy converter of a second embodiment according to the present invention.

As shown in FIG. 2, the energy converter A of this embodiment comprises the flexible plane unit 1 substantially rectangular, a topside piezoelectric energy conversion unit 30 arranged along the upper side peripheral edge 1s of the flexible plane unit 1, supporting substantially middle portion of the upper side peripheral edge 1s of the flexible plane unit 1 through a cord 51 as a transmission unit and converting the vibration energy into the electric energy, the bottom side piezoelectric energy conversion unit 31 attached to the flexible plane unit 1 through a string j1 as the transmission unit and converting the vibration energy into the electric energy, the supporting pole 7 arranged along the pedestal side of the flexible plane unit 1 and the bottom side piezoelectric energy conversion unit 31 and supporting the flexible plane unit 1 through a string j2, a rotating platform X supporting the supporting pole 7 and the bottom side piezoelectric energy conversion unit 31 and a base structure 9 having a rotating platform supporter 91 rotatably supporting the rotating platform X around the supporting pole.

The topside piezoelectric energy conversion unit 30 has the same structure with the bottom side piezoelectric energy conversion unit 31 of the first embodiment. And, in this embodiment, the topside piezoelectric energy conversion unit 30 is installed on the supporting pole 7 so that the displacement direction D2 of the piezoelectric bimorph element 3a of the topside piezoelectric energy conversion unit 30 can be almost the same with that of the plane part 1a of the flexible plane unit 1.

The bottom side piezoelectric energy conversion unit 31 has the same structure with the bottom side piezoelectric energy conversion unit 31 of the first embodiment. And, in this embodiment, this bottom side piezoelectric energy conversion unit 31 is installed on the rotating platform X so that the displacement direction D3 of the piezoelectric bimorph element 3a of the topside piezoelectric energy conversion unit 30 can be almost orthogonal to the plane part 1a of the flexible plane unit 1.

The rotating platform X supports the supporting pole 7 and the piezoelectric energy conversion unit 31.

In this embodiment, the base structure 9 includes the rotating supporting supporter 91 rotatably supporting the rotation platform X. Though the natural wind changes its direction, the power of the flexible plane unit 1 includes vibration component and low frequency component according to the wind direction to the topside piezoelectric energy conversion unit 30, therefore, the average power of the flexible plane unit 1 allows the rotating supporter 91 to rotate and the rotating supporter can be held in the direction of the high efficiency.

The use of the energy converter A of this embodiment is explained below.

First of all, the energy converter A is placed in the place where the wind blows.

And, when the flexible plane unit 1 is exposed to the wind, it flutters according to the wind pulse, while changing its form caused by the ever-changing pressure distribution the same as the first embodiment operates, and the vibration is exited by absorbing the energy of the wind pressure or the like added to the flexible plane unit 1. This vibration is excited at any wind velocity. The vibration exited on the flexible plane unit 1 as a vibration in the directions of the arrows D2 and D3 as shown in FIG. 2, is transmitted to the topside piezoelectric energy conversion unit 30 and the bottom side piezoelectric type energy conversion unit 31 through the strings j1 and j2 respectively. And the piezoelectric bimorph elements 3a, 3a of the topside piezoelectric energy conversion unit 30 and the bottom side piezoelectric type energy conversion unit 31 are displaced in the same direction as the vibration with the vibration energy reached to the topside piezoelectric energy conversion unit 30 and the bottom side piezoelectric type energy conversion unit 31, and the voltage is generated corresponding to its displacement. Thus, electric energy is obtained from the topside piezoelectric energy conversion unit 30 and the bottom side piezoelectric type energy conversion unit 31.

The vibration transmitted to the bottom side piezoelectric type energy conversion unit 31 is a drag vibration generated by a drag received from the wind in a direction that the flexible plane unit 1 prevents a vibration. When the piezoelectric bimorph element 3a converts the vibration energy by the drag vibration into the electric energy, that is, generates electricity, a power generation is proportional to the velocity of the wind and increases. Hence, the generation of the electricity can be maintained at any wind velocity. And therefore, the amount of power generation can be secured corresponding to the wind velocity even if the velocity is low.

Moreover, because the rotating platform X is heavy, it follows only to the slow change of the wind to rotate, but it is hardly to follow the movement of the high frequency of the flutter. That is, the direction of the flexible plane unit 1 changes automatically in response to the change of the wind direction, the best energy conversion can be secured.

Third Embodiment

Other embodiment of the present invention is explained below referring to the FIG. 3. Now, corresponding sighs are given to the units or the elements having the same function with the first embodiment, and the explanation is omitted.

Figure 3:
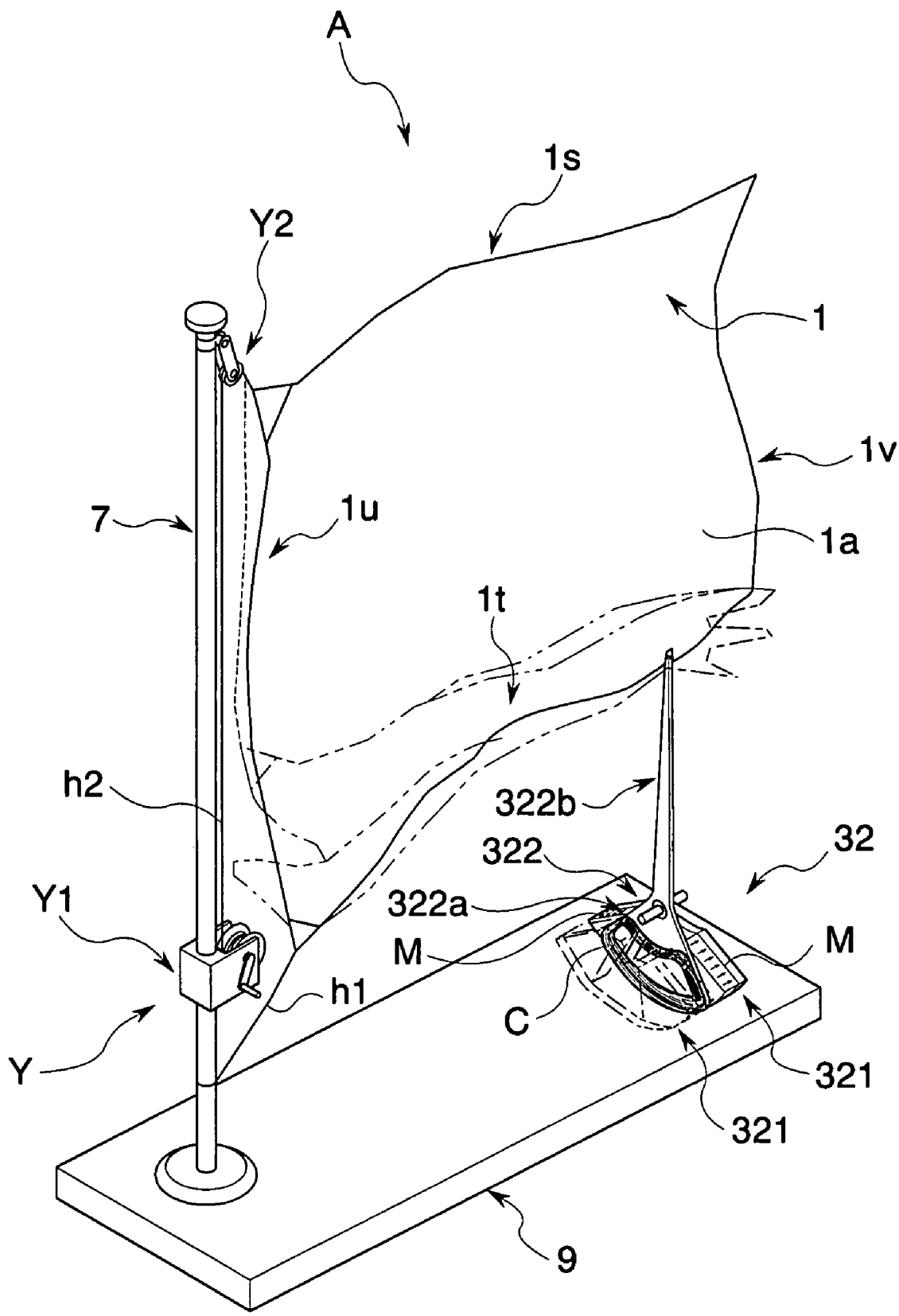
FIG. 3 is a whole perspective view showing the energy converter of a third embodiment according to the present invention.

As shown in FIG. 3, the energy converter A of this embodiment comprises the substantially rectangular flexible plane unit 1, the supporting pole 7 placed along the pedestal side of the flexible plane unit 1, hanging height position changing means Y attached to the supporting pole 7 for changing the height of the flexible plane unit 1, an electromagnetic induction type energy conversion unit 32 attached to a pedestal portion of the bottom side peripheral edge it of the flexible plane unit 1 and converting the vibration energy into electric energy, a string h1 arranged between a pedestal portion of the bottom side peripheral edge 1t of the flexible plane unit 1 and the supporting pole 7, and the base structure 9 supporting the supporting pole 7 and the electromagnetic induction type energy conversion unit 32.

The hanging height position changing means Y comprises a reel body Y1 enabling to reel a string h2 attached to the pedestal portion of the upside peripheral edge is of the flexible plane unit 1, and a pulley Y2 attached at the top of the supporting pole 7 and guiding the string h2 being reeled by the reel body Y1. If the string h2 is reeled up, the upside peripheral edge is of the flexible plane unit 1 is moved upward, and thus, the slack between the topside and the bottom side peripheral edge 1t can be removed. If the string h2 is reeled down, the upside peripheral edge 1s goes down, and the slack between the topside and the bottom side peripheral edge 1t appears.

The electromagnetic induction type energy conversion unit 32 has a pair of magnet portions 321 facing each other and a swinging unit 322 that swings between the magnet portions 321 like a pendulum. For the convenience of the explanation, the magnet portion 321 of near side in the view is illustrated by a broken line.

For more details, the magnet portion 321 has a substantially fan like shape and arranges a magnet M as a magnetic material on the opposite sides thereof. The swinging unit 322 comprises a coil part 322a arranged the coil C of a fan-shaped winding at a pedestal end thereof, and a triangular trunk part 322b functioning as a transmission unit and adjoined the coil part 322a at the pedestal end thereof. And, the flutter of the flexible plane unit 1 causes the vibration to the trunk part 322b, which swings the coil part 322a between the magnet portions 321 with the position adjoining the coil part 322a and the trunk part 322b as the rotation point.

The use of the energy converter A of embodiment is explained below.

First of all, the energy converter A is placed in the position so that the plane part 1a of the flexible plane unit 1 may be in substantially parallel in the wind direction.

Then, the vibration is excited on the flexible plane unit 1 by the wind the same as the first embodiment operates. The vibration excited is transmitted to the trunk part 322b and swings the coil unit 322a between the magnet portions 321. Thus, electric energy is generated by the electromagnetic induction caused while the coil C swings between the magnets M of the magnet portions 321.

The present invention is not limited to the embodiments explained above.

Figure 4:
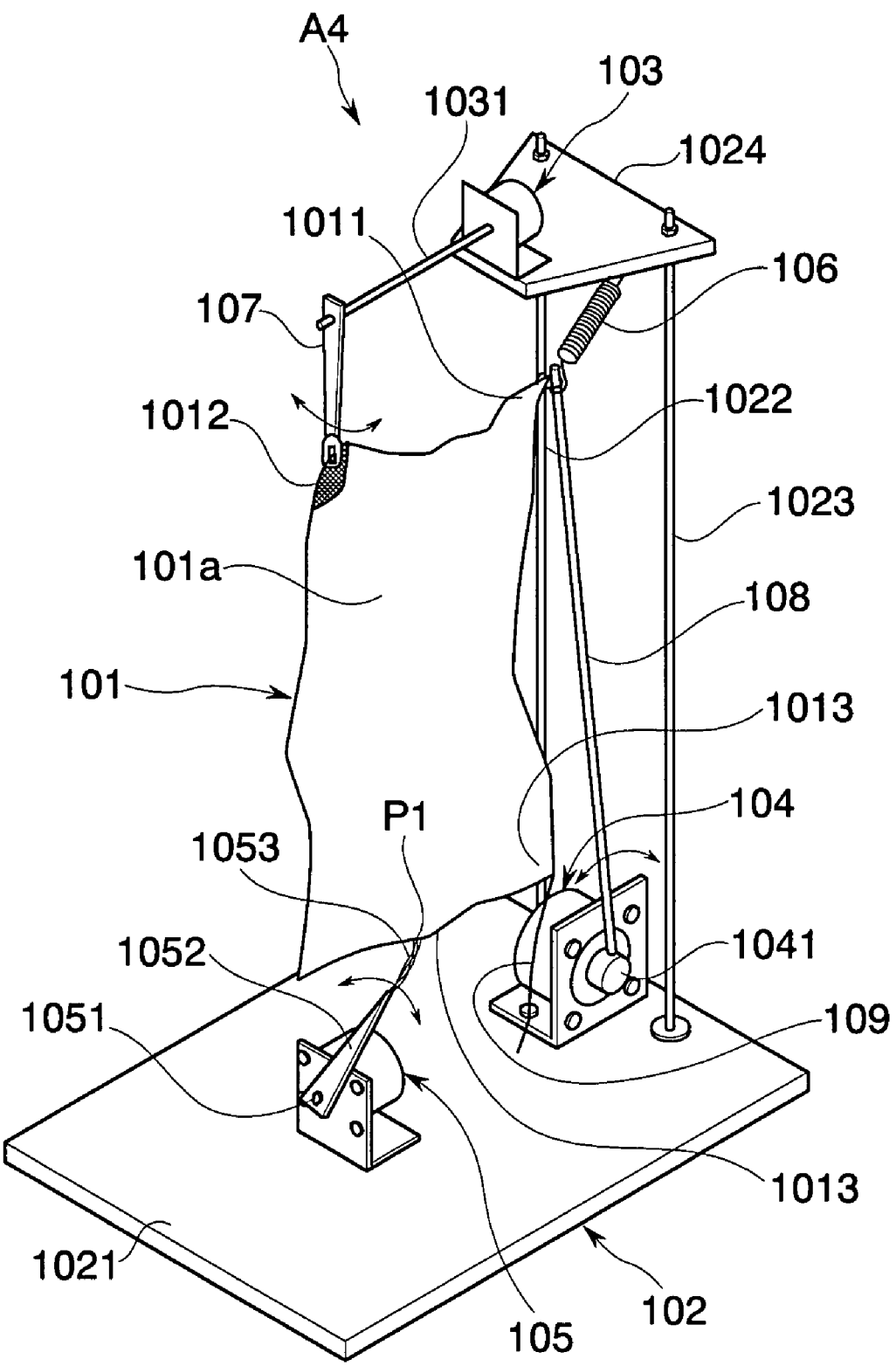
FIG. 4 is a whole perspective view showing the energy converter of a fourth embodiment according to the present invention.

For instance, the rectangular flexible plane unit having the longer size for the vertical direction, so-called "Flag" can be adopted. An embodiment using this flag type flexible plane unit 101 is explained referring to FIG. 4.

Fourth Embodiment

An energy converter A4 comprises a flexible plane unit 101 having a rectangular shape, the vertical size of which is larger than the lateral size, a supporting structure 102 supporting the flexible plane unit 101, three rotary dynamos 103, 104, and 105 that compose a energy conversion unit converting the vibration energy into electric energy when the flexible plane unit 101 swings, and a transmission unit connecting the flexible plane unit 101 with the three rotary dynamos 103, 104, and 105.

The flexible plane unit 101 is made of the cloth such as the polyester fiber, but the size of a material yarn and weaving method are not specified. As explained hereinafter, the flexible plane unit 101 connected with the transmission unit is supported by the supporting structure 102 so that it can flutter, and a bottom corner 1013 thereof on the windward side is connected to the supporting structure 102 with a string 109. If the flexible plane unit 102 is made from the polyester fiber, flutter of the flexible plane unit 102 in wet condition is weaker than that in dry condition, but it gets dry fast, entire energy conversion efficiency does not decrease so much. However, in order that the flexible plane unit 101 can flutter efficiently even if the wind velocity is low, its material is preferred to be light. In addition, considering the case where the flexible plane unit 101 gets wet, it is desirable that the flexible plane unit 101 should be of water-repellent and/or waterproof processed.

The supporting structure 102 comprises a base structure 1021, two supporting poles 1022 and 1023 stood on the base structure 1021, and a supporting platform 1024 fixed on both tops of the supporting poles 1022 and 1023. The supporting platform 1024 supports the topside rotary dynamo 103 functioning as an energy conversion unit, and a coil spring 106 on its undersurface. The upside end of the coil spring 106 is fixed on the undersurface of the supporting platform 1024, while the bottom end thereof is connected with the topside corner of the windward side of the flexible plane unit 101. The coil spring 106 hangs the flexible plane unit 101 so as to cause the drag vibration by the elasticity thereof at the topside corner 1011 on the windward side of the flexible plane unit 101.

The topside rotary dynamo 103 converts into electric energy the vibration energy that is generated in the orthogonal direction to the wind direction on the top reinforced corner 1012 on the leeward side of the flexible plane unit 101. For that purpose, an arm member 107 which constitutes a transmission member is attached to the rotating shaft 1031 of the topside rotary dynamo 103. The bottom end of this arm member 107 is connected with the reinforced corner 1012 on the leeward side the flexible plane unit 101.

The first bottom side rotation dynamo 104 and the second bottom side rotation dynamo 105 except the topside rotary dynamo 103 are installed on the base structure 1021. The first bottom side rotary dynamo 104 converts into electric energy the vibration energy caused by the vibration of the direction of the wind which is generated on the top corner 1011 on the windward of the flexible plane unit 101. A rod 108 functioning as a transmission unit is connected with the rotation shaft 1041 of the first bottom side rotary dynamo 104. The top end of the rod 108 is connected with the top corner 1011 on the windward side of the flexible plane unit 101 to which the coil spring 106 is coupled.

The second bottom side rotary dynamo 105 converts into electric energy the vibration energy caused by the vibration orthogonal in the wind direction of the bottom side peripheral edge 1013 of the flexible plane unit 101. The arm member 1052 functioning as a transmission unit is connected with the rotary shaft 1051 of the second bottom side rotary dynamo 105. The top end of the arm member 1052 is connected with a flexible string 1053 functioning as a transmission unit. The top end of the string 1053 is connected with a joint position P1 of the bottom side peripheral edge 1013 of the flexible plane unit 101. The joint position P1 is set in the best position depending upon the size of the flexible plane unit 101. And in the case of the flag type flexible plane unit of the portrait shape 101, it is confirmed by an experiment that the best position exists in the intermediate portion of the bottom side peripheral edge 1013 of the flexible plane unit 101 not in the opposite portion thereof.

Next, the movements of the energy converter A4 of this embodiment are explained.

Concerning the energy converter A4, the plane part 101a of the flexible plane unit 101 is placed in substantially parallel in the wind direction the same as the above-mentioned embodiments. At the same time, the flexible plane unit 101 is also placed so that the supporting poles 1022 and 1023 may be located on the windward side.

And then, when the wind blows, the vibration is excited on the flexible plane unit 101. The vibration generated on the topside reinforced corner 1012 in the leeward side is transmitted to the rotary shaft 1031 of the topside rotary dynamo 103 through the arm member 107 and drives the topside rotary dynamo 103, whereby, the vibration energy generated on the topside reinforced corner 1012 in the leeward side is converted into the electric energy. Likewise, The vibration generated on the topside corner 1011 in the windward side is transmitted to the rotary shaft 1041 of the first bottom side rotary dynamo 104 through the rod 108 and drives the first bottom side rotary dynamo 104, whereby, the vibration energy generated on the topside corner 1011 in the windward side is converted into the electric energy. In addition, the vibration generated on the bottom side peripheral edge 1013 of the flexible plane unit 101 is transmitted to the rotary shaft 1051 of the second bottom side rotary dynamo 105 through the string 1053 and the arm member 1052 to drive the second bottom side rotary dynamo 105. As a result, the vibration energy generated on the bottom side peripheral edge 1013 is converted into electric energy.

In such a configuration, the first bottom side rotary dynamo 104 generates electricity with the vibration of the topside edge 1011 on the windward side, namely, the drag vibration that is transmitted through the rod 108. On the other hand, the topside rotary dynamo 103 and the second bottom side rotary dynamo 105 are driven by the vibration caused by the swing orthogonal in the wind direction on the flexible plane unit 101 and generates electricity.

Therefore, even if the wind velocity is low, the first bottom side rotary dynamo 104 is driven and converts the vibration energy transmitted into electric energy. In addition to that, the topside rotary dynamo 103 and the second bottom side rotary dynamo 105 also continue to generate electric energy in response with the flutter of the flexible plane unit 101. As a result, each of the rotary dynamos 103, 104 and 105 continue to operate even if the wind velocity fluctuates, and therefore, the power generation can be secured all the time.

The experiment results conducted in this fourth embodiment are explained below.

Concrete Composition:

Flexible plane unit 101: 370 mm in length, 170 mm in width, and 50 g/m$^2$ in specific gravity/area First bottom side rotary dynamo 104: 2 phase hybrid pulse motor (stepping motor), Step angle: 7.5 degree, Coil resistance: 38Ω×2

(1) Waveform of Output Voltage

Figure 5:
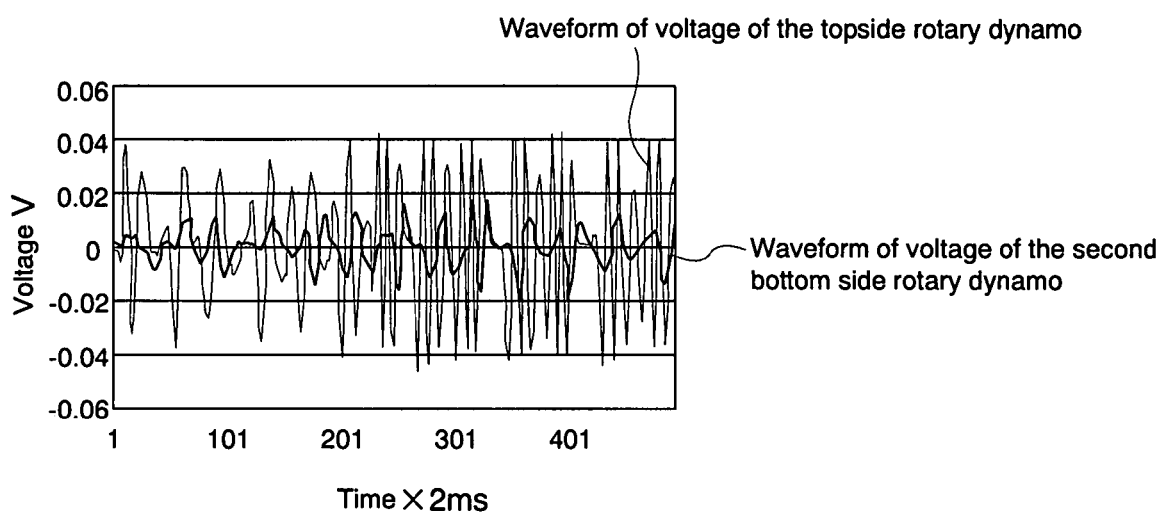
FIG. 5 is a graph showing an experiment result in the fourth embodiment according to the present invention.

FIG. 5 shows the change (shape of waves) in the output voltage of the topside rotary dynamo 103 and the second bottom side rotary dynamo 105. The flutter of the flexible plane unit 101 causes the reinforced topside corner 1012 on the leeward side and the bottom side peripheral edge 1013 of the flexible plane unit 101 to swing in the orthogonal direction to the wind direction. Each of the coils of the rotary dynamos 103 and 105 is scanned with this swing through several step angles, and then output voltage therefrom are plotted.

The reason why the frequency of the output voltage of the topside rotary dynamo 103 is higher than that of the second bottom side rotary dynamo 105 in this graph originates in that the former swing amplitude is larger. In addition, the cycle of the output voltage of the topside rotary dynamo 103 does not indicate that of the swinging movement itself of the flexible plane unit 101.

In this experiment, the flutter of the flexible plane unit 101 is influenced greatly by the supporting position of the flexible plane unit 101, that is, the position of the reinforced topside corner 1012 on the leeward side and the tension given by the coil spring 106. This graph shows that the intermittent large flutter and the dormant period appear alternately in many cases. In these cases, the output voltage is influenced greatly by the position of the bottom side corner 1013 on the windward side of the flexible plane unit 101.

(2) The Relation Between the Output Electric Power and the Joint Position P1 at which the Flexible Plane Unit 101 Joint to the Transmission Unit.

Figure 6:
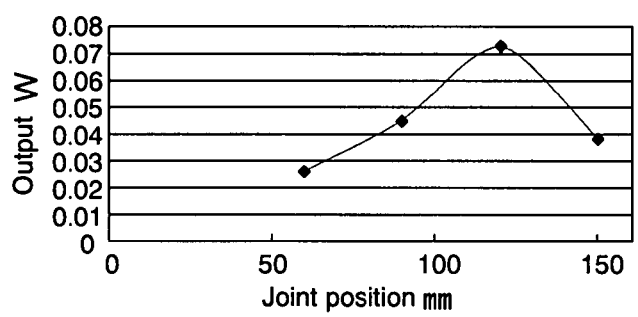
FIG. 6 is a graph showing an experiment result in the fourth embodiment according to the present invention.

FIG. 6 shows the change in the output electric power when the joint position is changed. From this experiment, it is found that the best joint position P1 with the bottom side peripheral edge 1013 exists at an intermediate point between the opposite ends of the bottom side peripheral edge 1013. In this experiment, the electric power outputs at the joint positions P1 are recorded on the condition that the flexible plane unit 101 flutters almost continuously by setting up the appropriate condition such as the wind velocity. The tendency of the output voltage change to the joint position change also appears in the configuration of the second embodiment.

(3) Relation Between Electric Power and Wind Velocity

Figure 7:
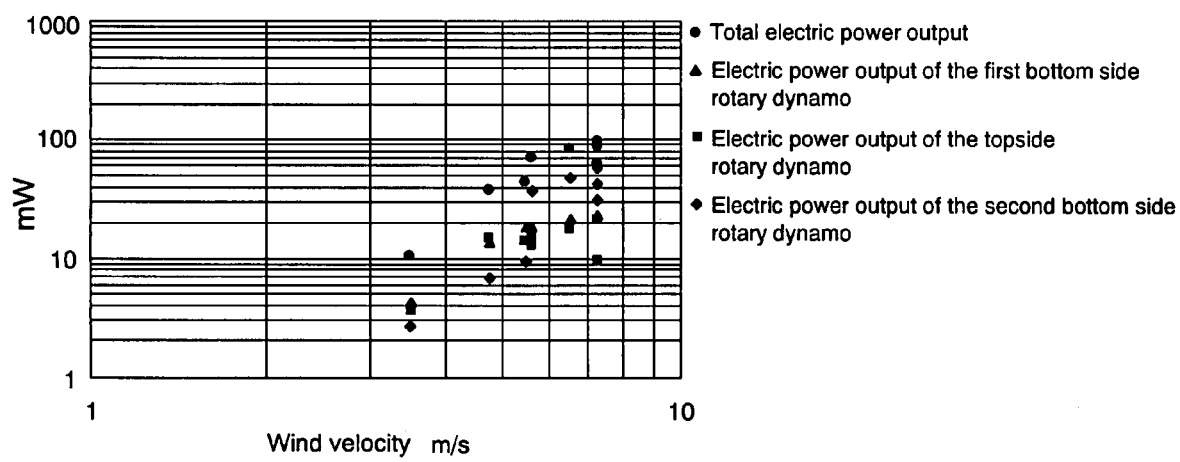
FIG. 7 is a graph showing an experiment result in the fourth embodiment according to the present invention.

FIG. 7 shows the change in the output electric power when the wind velocity is changed. Though each of the electric power output of the rotary dynamos 103, 104 and 105 is uneven, the inclination of the total electric power output, namely, the change of the total electric power output to the wind velocity is almost proportional to the cubic value of the wind velocity. Assuming that the swept area is the area formed by the flutter in this experiment, the efficiency calculated by using this value is approximately 1.8%.

Figure 8:
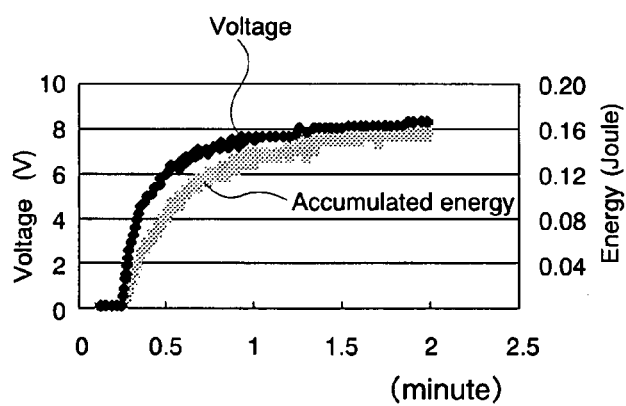
FIG. 8 is a graph showing an experiment result in the fourth embodiment according to the present invention.

In order to estimate the active electric power, the output of the one coil of a rotary dynamo, that is, pulse motor was rectified and charged to the capacitor of 4700 μF in capacity. As shown in FIG. 8, the terminal voltage of the capacitor rose to 7.5 V for one minute since the beginning of the charging, and the accumulated energy amounted to 0.13 J. The total value of the 6 coils is estimated to be 0.8 J. Therefore, if an appropriate electric circuit is applied, the sufficient electric power can be supplied to the remote sensing system that communicates intermittently.

Though the flexible plane unit 1 is exposed to the wind in each of the above-mentioned embodiments, other fluid such as water can be used.

Additionally, each of the components can be used not only for the above-mentioned embodiments but also for many other alternatives in the range that does not deviate from the purport of the present invention.

Possibility to Use for Industry

The present invention can be applied to the places or the facilities mentioned below.

(1) Power Supply Equipments for a Wireless Network Nearby Route of a Climbs, Etc.

If a transmission distance is short, wireless devices composing the wireless network can be operated with a small amount of electric power. Therefore, the present invention is preferred to be applied to the wireless network composed by many wireless stations in a short distance, because the total electric power can be reduced. In this case, the wireless apparatus is realized by a cellular phone partially remodeled, and the present invention can be used as its power supply together with the solar battery. By employing this composition, the comprehensively economical and efficient system can be achieved.

(2) Pay Battery-Charging Equipments for the Cellular Phones Installed Nearby Route of a Climbs and Roads, Etc.

If the charging fee can be paid with the debit card function of the cellular phone, the convenience is improved and a theft of this equipment can be prevented. As an application of this example, the invention can be applied to an automatic vending machine of soft drinks, etc. with no temperature adjustment function to reduce the power consumption and also an automatic vending machine of clothes for cold weathers needing no temperature adjustment function.

(3) Image Monitoring Equipment in Islands Including Uninhabited Island Etc.

Though a power supply must be secured surely to such an image monitoring equipment, if the power supply coordinated with a solar battery is employed, it is possible to prolong the maintenance interval.

(4) Train Passing Monitoring Equipment in a Subway Station and a Tunnel

In the subway station and the tunnel, the wind caused by the train running can generate the electric power, a train passing signal indicating a train passing is generated, and the train passing signal is monitored. By generating the electric power with such a way, a monitoring system is allowed to employ at a place where the solar battery cannot be used. As an application of such a monitoring apparatus, an apparatus for detecting and alarming an outbreak of an extraordinarily strong wind that blows often in valleys.

In the above-mentioned applications, it goes without saying that the monitoring apparatus is composed so as to inform power supply status to a station for concentratedly controlling those equipments through a wireless. This composition can improve the reliability of the facilities.

(5) Power Supply for Tag Chips Placed on Merchandises.

In an almost unattended warehouse, a merchandise information reader installed on a robot for the merchandise management transmits a power to the tag chip through the wireless in order to read the merchandise information the tag chip attached on the merchandise, therefore, comparatively large electric power is needed and the merchandise information reader must be approached to the tag chip. There is sometimes a case where it is not possible to approach to the tag chip installed in the merchandise in a package and then, a larger electric power is necessary. If a power generation translator activated by the flutter of the flexible plane unit (flag) is placed outside the package, the electric power transmission antenna can be arranged near the merchandise inside the package. According to the necessity, the wind generated by the blower is sent to the power generation translator, and the tag chip supplied the electric power transmitted from the power generation translator outputs the response signal through the wireless. If the reception sensibility of the merchandise information reader is improved, it can read from the longer distance and collect the merchandise information. The advantageous of the structure of the invention is in an employment in the dark place like the warehouse where the merchandises are pilled and the solar battery cannot be used.

As an application example same as the above, the sample to be applied to containers shipped is given. In case of shipping, because the strong wind can be expected, the stable operation can be assured.

If the electric power obtained from the present invention is accumulated to these kinds of batteries, it can be used more effectively. For the accumulation method of the electric power, some other media than electricity can be considered such as hydrogen that operates the fuel cell. The widely known methods can be used for the accumulation of the electric energy.

The invention claimed is:

1. An energy converter characterized by comprising a flexible plane unit made of cloth and placed in a position to be exposed to a flow of fluid such as wind, at least a part of peripheral edge of the flexible plane unit being capable of fluttering freely with the flow, an energy conversion unit for converting vibration energy into electric energy, a transmission unit connected to the flexible plane unit and for transmitting a vibration caused on the flexible plane unit by the flow to the energy conversion unit, and a base structure being able to be fixed on a building, a ground or the like, wherein a supporting pole supported on the base structure supports the flexible plane unit so as to flutter freely without a proper period, and the energy conversion unit is a rotatable dynamo using a electromagnetic induction of a magnetic substance and a coil.

2. The energy converter according to claim 1, wherein a stopper having a pair of stopper edge provided away from the pedestal side of the peripheral edge of the flexible plane unit made of cloth so as to sandwich the pedestal side of the peripheral edge which becomes the reference axis of fluttering is provided.

3. The energy converter according to claim 1, wherein a hanging unit for hanging the part or whole of the peripheral edge of the flexible plane unit made of cloth with allowance of fluttering substantially free is provided.

4. The energy converter according to claim 1, wherein a stopper having a pair of stopper edge provided away from the pedestal side of the peripheral edge of the flexible plane unit made of cloth so as to sandwich the pedestal side of the peripheral edge which becomes the reference axis of fluttering is provided.

5. The energy converter according to claim 1, wherein the flexible plane unit is of a vertically long flag having a longitudinal dimension in perpendicular direction.

6. The energy converter according to claim 1, wherein a supporting pole being provided along the pedestal side of the flexible plane unit which becomes the reference axis of fluttering and supporting the flexible plane unit indirectly or directly, and a rotatable supporting portion supporting the supporting pole so as to be able to rotate around a axis of the supporting pole.

7. The energy converter according to claim 1, wherein when the flexible plane unit made of cloth is placed in substantially parallel in a flowing direction of the fluid, the transmission unit transmits to the energy conversion unit a vibration generated in a flowing direction of the fluid at an upstream side of the fluid of the flexible plane unit made of cloth.

8. The energy converter according to claim 1, wherein when the flexible plane unit made of a cloth is placed in substantially parallel in a flowing direction of the fluid, the energy conversion unit is installed on a flagpole functioning as the transmission unit and a vibration generated on the flexible plane unit made of cloth is transmitted to the energy conversion unit as the flagpole vibration.

9. The energy converter according to claim 1, wherein a transmission unit coupled at intermediate position between the upstream side and downstream side of the fluid of the flexible plane unit transmits to the energy conversion unit the vibration generated by making an end of downstream side of the fluid of the flexible plane unit made of cloth into a free end.

10. The energy converter of claim 1, wherein the transmission unit is composed by a string.

* * * * *